Jan. 6, 1953     E. R. BLOUT ET AL     2,624,240

INFRARED BAND PASS FILTER

Filed March 10, 1949     2 SHEETS—SHEET 1

Patented Jan. 6, 1953

2,624,240

UNITED STATES PATENT OFFICE 2,624,240

INFRARED BAND PASS FILTER

Elkan R. Blout, Cambridge, Richard S. Corley, Boston, and Patricia L. Snow, Cambridge, Mass., assignors to Polaroid Corporation, Cambridge, Mass., a corporation of Delaware Application March 10, 1949, Serial No. 80,608

6 Claims. (Cl. 88—109)

This invention relates to band pass filters which are substantially opaque to visible radiation and to radiation in the near-infrared and more particularly to all wavelengths less than about 900 m$\mu$, which show relatively very low transmission for wavelengths in the infrared between 1 micron and about 3.5 microns, and which show relatively high transmission for a narrow band of wavelengths in the infrared between about 3.5 microns and about 5.5 microns.

Objects of the invention are to provide filters of the character described in sheetlike form which are self-supporting, stable, durable, readily handled, easily manufactured, cheap, and of high optical quality; to provide such filters of synthetic plastic sheets comprising partially dehydrohalogenated poylvinyl chloride, polyvinylidene chloride or copolymers thereof, coated with a layer, or film, or dispersion of minute particles, the particles being of such size as to effectively block a predetermined portion of the radiation band transmitted by the plastic sheet whereby the transmission characteristics of the coated sheet are so controlled that the combined filter effectively blocks all radiation except a narrow wave band between about 3.5 microns and 5.5 microns which is efficiently transmitted; and to provide a filter of the character described which is effectively stabilized against the action of heat and weathering.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 2:
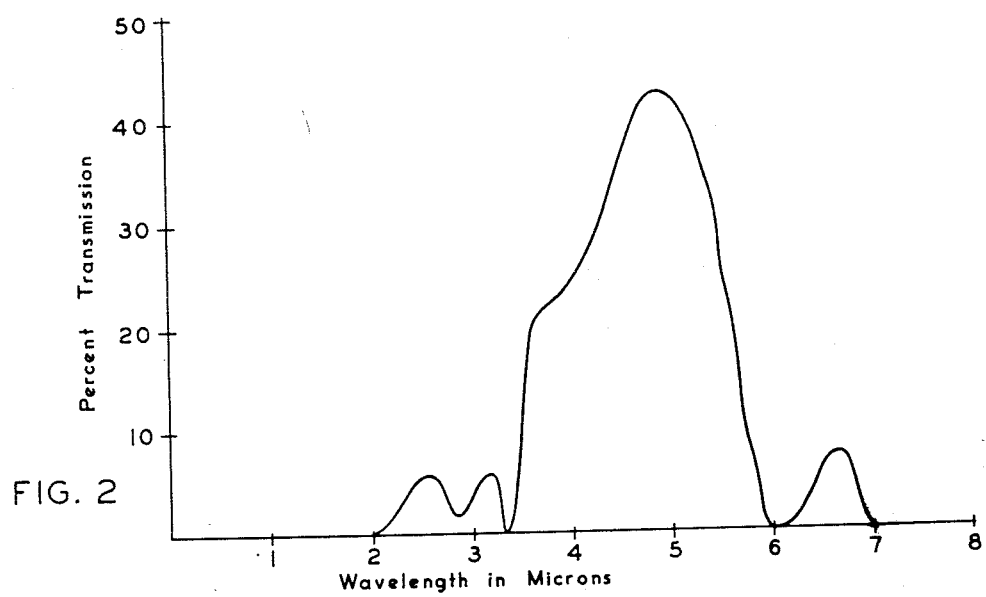
Fig. 2 is a graph illustrative of the transmission characteristics of a filter such as is illustrated for example in Fig. 1, the per cent transmission being plotted against the wavelength in microns.
Figure 3:
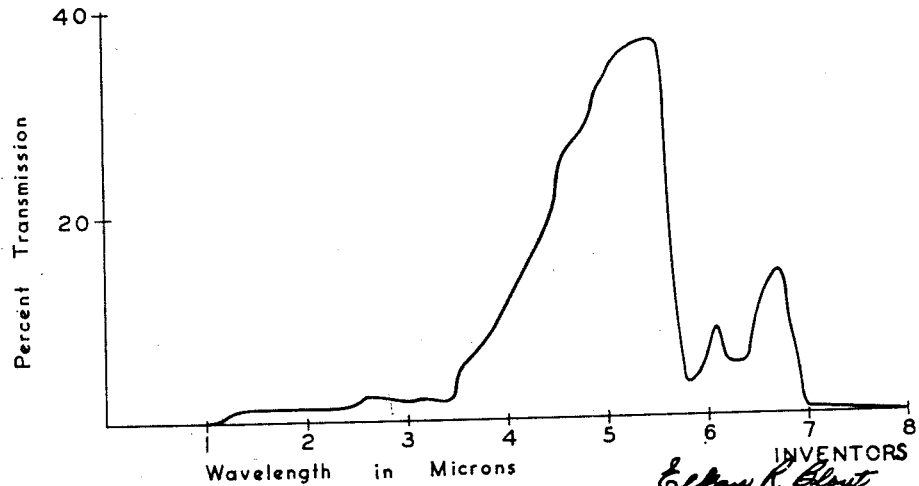
Fig. 3 is a similar graph of a further modification of the invention.
Figure 4:
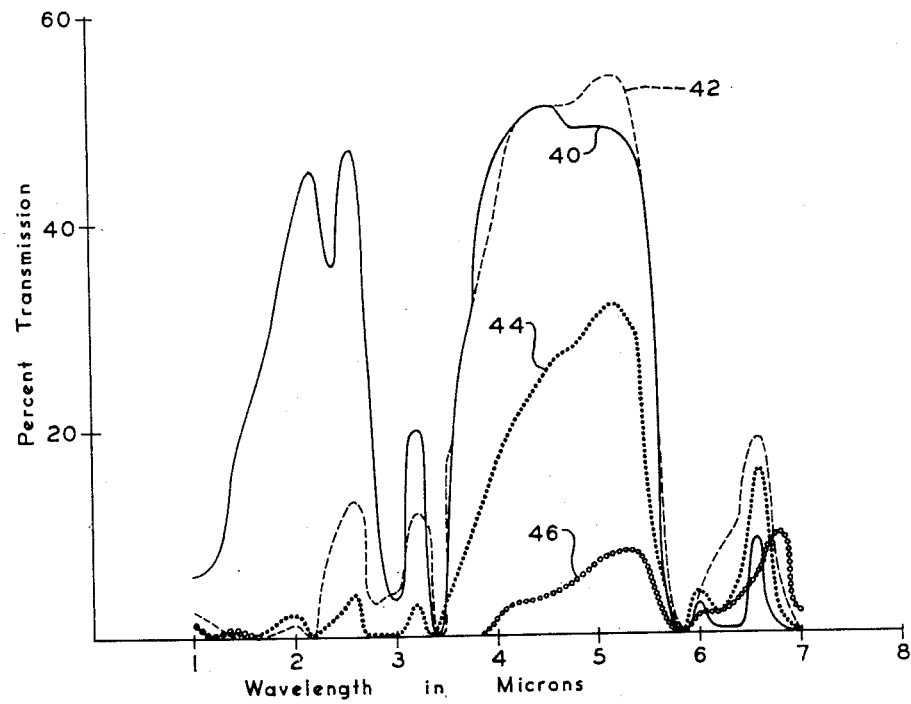
Figure 5:
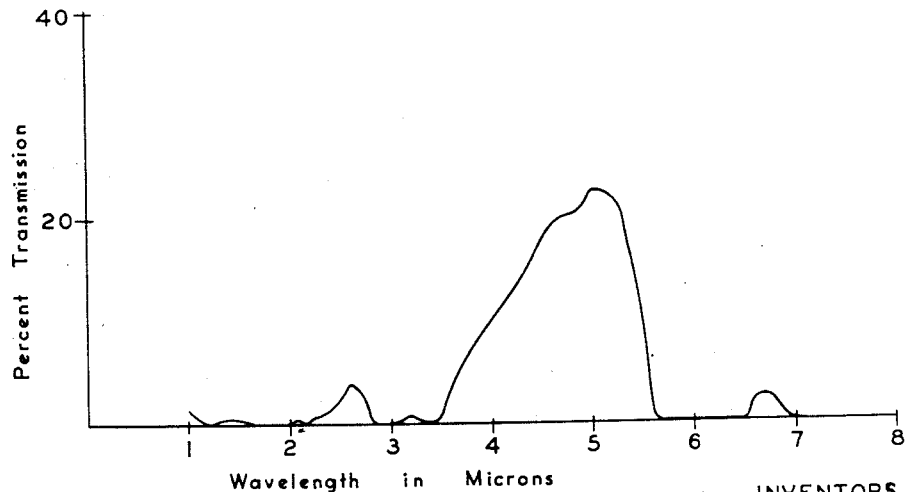

Fig. 4 is a graph, similar to Figs. 2 and 3, illustrating transmission curves of four powder filters comprising layers or films of zinc oxide of differing predetermined average particle size in linseed oil on rock salt, the figure illustrating the change in transmission characteristics of a powder layer with change in average particle size; and Fig. 5 is a graph, similar to Figs. 2 and 3, illustrating the transmission characteristics of a combination filter of the present invention, comprising a sheet of partially dehydrohalogenated polyvinyl chloride coated with one of the powder films, the transmission characteristics of which are illustrated in Fig. 4.

The present invention is concerned with the production of narrow band pass filters showing relatively high transmission in the wavelength band between about 3.5 microns and 5.5 microns, showing substantially complete opacity for radiation of wavelengths less than about 900 m$\mu$ and including all radiation in the visible, and showing very low transmission and substantial opacity for radiation in the wavelength band between about 1 micron and about 3.5 microns. Such filters possess great utility in signaling devices employing infrared radiation and in many other fields of activity where infrared radiation is employed and visible radiation excluded.

In the copending application of Blout, Campbell, Corley and Snow, Serial No. 79,244, filed March 2, 1949 for Infrared Band Pass Filter, there is disclosed a band pass filter for infrared radiation showing relatively high transmission in the wavelength band between about 1 micron and 5.5 microns, except for a relatively narrow band in the neighborhood of 3.5 microns, and comprising a sheet or film of partially dehydrohalogenated polyvinyl chloride or polyvinylidene chloride. The filter is manufactured by employing a sheet of a commercially available plasticized polyvinyl chloride or a sheet of a commercially available plasticized copolymer of polyvinyl chloride with a small percentage of either polyvinyl acetate or polyvinylidene chloride. In lieu of polyvinyl chloride, polyvinylidene chloride or copolymers thereof with small amounts of either polyvinyl acetate, polyvinyl chloride or some other like plastic may also be employed. The transmission characteristics of the polyvinylidene chloride sheets are substantially like those of the polyvinyl chloride sheets except for a still further narrow absorption band in the neighborhood of 5 microns. The polyvinyl chloride sheets are preferred. The sheet or film of polyvinyl chloride or polyvinylidene chloride is imbibed in a bath comprising a swelling agent, a conversion agent and a diluent, and is maintained in the bath until the process has progressed to a satisfactory point. For example, where polyvinyl chloride is employed, imbibition in the bath at room temperature for a period of approximately twenty minutes is satisfactory. The treating bath may comprise, for example, 100 cc. of methyl ethyl ketone as the swelling agent; 18 cc. of a 40% solution of benzyl trimethyl ammonium hydroxide in water as the conversion agent; and 30 cc. of a mixture of ethyl alcohol and ethyl acetate as the diluent. These materials and their proportions may be varied without departing from the process of the invention.

After the sheet has been treated in the bath it is removed and washed with water. It is then subjected to a heat treatment which substantially reduces the quantity of plasticizer and water in the sheet, and which converts the sheet by the partial dehydrohalogenation of the polyvinyl chloride or polyvinylidene chloride therein to an opaque, strong, pliable, resilient infrared band pass filter. The heating may be at a temperature of from 120° C. to 160° C. and for a period of from six to eight hours. Sheets which have been partially dehydrohalogenated in the manner heretofore described suffer a loss of chlorine of from one-fifth to one-third the initial chlorine content thereof.

The said copending application also discloses a method of stabilizing the filter against the action of heat and weathering by coating the exposed surfaces of the film of partially dehydrohalogenated polyvinyl chloride with a protective plastic, for example with a film of polyvinylidene chloride. The coating may be applied by dipping the sheet in a weak solution of the stabilizing plastic in a suitable solvent such as methyl ethyl ketone, and the stabilizing film may be built up by successive dips until the desired thickness is obtained. Films of the order of .0003 inch have proven satisfactory.

The present invention relates to narrow band pass filters which employ as one element the stabilized partially dehydrohalogenated sheet disclosed in the said copending application, but which differs from the product there disclosed and claimed by combining, with the partially dehydrohalogenated polyvinyl chloride or polyvinylidene chloride filter, a layer, or film, or suspension of minute particles of a suitable substance in such concentration and of such particle size as to block substantially completely that portion of the wave band transmitted by the partially dehydrohalogenated polyvinyl chloride film which lies between 1 micron and 3.5 microns.

The product of the present invention transmits effectively only a very narrow wavelength band, namely, the band between about 3.5 microns and about 5.5 microns, and while the use of the powder layer impairs to some extent the transmission of the filter for even this narrow band, the filters of the present invention may transmit from 20% to 40% of the radiation within the specified wavelength band, and such transmission is adequate to permit effective use of the filter in connection with signaling systems and other applications where an extremely narrow band pass filter in the infrared is desired.

Materials which have proven satisfactory for use in the production of the present invention are titanium dioxide, magnesium oxide and zinc oxide, and of these materials titanium dioxide is preferred.

Figure 1:
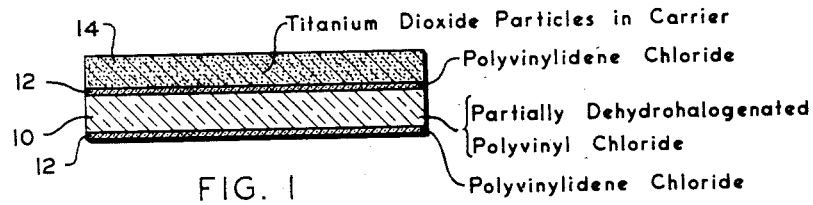
Figure 1 is a view in section of a filter embodying a preferred modification of the invention.

In Fig. 1 there is shown a view in section of a filter embodying a preferred form of the invention. The filter comprises a layer or sheet of partially dehydrohalogenated polyvinyl chloride 10 formed in the manner heretofore described, and having on each of its surfaces a thin film 12 of a stabilizing material, for example polyvinylidene chloride. A relatively thin layer or film of a titanium dioxide paint 14 covers one surface of the filter. This paint may comprise any suitable commercially available titanium dioxide paint, for example Duluxe Superwhite Enamel, a paint which comprises particles of titanium dioxide, zinc oxide, and a titanium calcium mixture suspended in a carrier comprising approximately 56% of a synthesized oil, 5% of a drier and 39% hydrocarbons. The suspended pigment is augmented by incorporating in the paint, prior to coating the dehydrohalogenated polyvinyl chloride film, a substantial quantity, for example from between 15% to 40% by weight of the paint, of minute particles of titanium dioxide of mean linear dimensions of the order of .35 micron. This additional pigment or powder material is mulled into the paint. The finished filter may have an overall thickness of the order of .006 inch, of which approximately .0025 inch may be the suspended pigment layer, and the remainder or about .0035 inch may comprise the partially dehydrohalogenated polyvinyl chloride with its protective coatings.

In lieu of a commercially available paint as the vehicle for suspending the titanium dioxide pigment, a suspension of titanium dioxide of average particle size of the order of .35 micron may be prepared by mulling into any suitable carrier, for example a mixture of an oil, a drier and a thinner in the proportions normally employed in the preparation of paints, a substantial quantity, for example 25% to 40% by weight, of the pigment. With such a suspension a coating of the order of .002 inch to .003 inch in thickness has been found satisfactory and, when combined with a sheet of partially dehydrohalogenated polyvinyl chloride or partially dehydrohalogenated polyvinylidene chloride, produces a filter having the desired optical properties.

A typical transmission curve for such a filter is shown in Fig. 2. It will be noted that the filter, for which the curve of Fig. 2 is illustrative, shows substantially zero transmission for all radiation below 2 microns, and shows very low transmission of the order of from 2% to 5% for radiation between 2 microns and 3.5 microns. The filter shows a substantially increased and commercially useful transmission for the wavelength band between 3.5 microns and 5.5 microns or 5.7 microns, reaching a peak of better than 40% transmission for radiation in the neighborhood of 5 microns. Such a filter is of great utility in connection with the transmission of signals by infrared radiation over a narrow wave band of, for example, 2 microns. It effectively blocks all radiation below 3.5 microns and above 5.7 microns. The cutoff between 5 and 6 microns arises from the use in the filter of the partially dehydrohalogenated polyvinyl chloride or polyvinylidene chloride, while the blocking of all radiation below 3.5 microns and above 1 micron arises essentially from the use of the suspended powder layer. The combination of the two elements thus effectively provides a filter with distinctive and useful properties.

It is to be understood that the product of the present invention may be formed in other ways than by the application of a suspension of minute pigment or powder particles to a surface of the partially dehydrohalogenated polyvinyl chloride. Satisfactory filters may, for example, be formed by depositing the powder material directly onto the surface of the dehydrohalogenated plastic, as for example by fuming. Fig. 3 illustrates the transmission curve of such a filter. In this embodiment of the invention, magnesium oxide was fumed onto one surface of a sheet of partially dehydrohalogenated polyvinyl chloride. The average size of the deposited particles of magnesium oxide, while difficult of ascertainment, was probably of the order of .5 micron. The filter obtained showed substantially complete cutoff below 1 micron, very low cutoff of the order of 2% or less for the wave band between 1 micron and 3.5 microns, and then a sharply increased transmission to a peak of better than 35% at about 5 microns. Such a filter can be usefully employed in connection with signal systems of the character heretofore described.

It is to be understood that the average particle size of the suspended powder or pigment is important. A preferred filter will employ a suspension or deposit of particles which are no larger than may be necessary to effectively block radiation below 3.5 microns.

Fig. 4 is illustrative of the transmission characteristics of four suspensions of zinc oxide particles, of different average particle size, in linseed oil. Curve 40 indicates the transmission properties of a suspension of zinc oxide of average particle size of .15 micron in linseed oil on rock salt. It will be noted that with such a suspension, a very substantial amount of radiation between 1 micron and 3 microns is transmitted.

Curve 42 illustrates the transmission properties of a similar suspension where the average particle size is approximately .19 micron. It will be noted that the transmission below 2 microns is substantially zero, and the transmission between 2 microns and 3.5 microns has been reduced to the order of about 10%.

Curve 44 illustrates the transmission properties of a similar suspension wherein the average particle size is of the order of .3 micron. It will be noted that radiation below 3.5 microns has been substantially suppressed and in no case exceeds above 2% or 3%, while the transmission for the suspension at 5 microns is still better than 30%.

Curve 46 illustrates the transmission properties of a similar suspension wherein the average particle size is 1 micron. Here all radiation below about 4 microns has been substantially blocked, and the transmission of radiation between 4 microns and 5.5 microns has been reduced to a peak of not more than 8%.

In the practice of the present invention the preferred particle size would be that illustrated by the transmission curve 44 of Fig. 4, i. e., a particle size of the order of .3 micron, where the transmission for radiation at 5 microns is still adequate to provide a useful filter, while the transmission for radiation below 3.5 microns has been substantially suppressed. Fig. 5 illustrates the transmission properties of a filter formed by coating a sheet of partially dehydrohalogenated polyvinyl chloride with a suspension of zinc oxide particles in linseed oil, the average particle size being of the order of .3 micron. It will be seen that the transmission properties of such a filter closely approximate those of curve 44 of Fig. 4, except that the transmission band above 5.5 microns has been effectively suppressed by the use of the dehydrohalogenated polyvinyl chloride and the maximum transmission at about 5 microns has been reduced from slightly more than 30% to about 23%. This is, however, a useful transmission and the filter illustrated by Fig. 5 is to be understood as embodying an operative and useful form of the present invention.

It will be noted that the three materials specified as useful in the practice of the present invention as suspended powders or minute particles are metallic oxides. These three materials are available in carefully measured particle sizes and, while the presence of particles of smaller than average particle size in the suspended or deposited powder layer does not seriously affect the operation or optical properties of the filter, the presence of any appreciable quantity of particles substantially larger than the specified mean or average particle size is to be avoided. The powder suspension or deposit of the present invention is preferably as thin and of such high particle concentration as can conveniently be employed to obtain the desired results.

For the purposes of the present invention, i. e., for the production of filters wherein radiation below 3.5 microns is to be effectively blocked by the powder layer, a preferred particle size may be said to be between about .25 micron and .5 micron and more specifically about .35 micron, and this particle size seems to be effective for each of the three materials specified.

There is thus provided a sturdy, durable, cheap and effective narrow band pass filter for radiation in the infrared between about 3.5 microns and 5.5 microns.

Since certain changes may be made in the above product without departing from the scope of the invention herein involved, it is intended that all matter contained in the above description, or shown in the accompanying drawings, shall be interpreted as illustrative and not in a limiting sense.

The Government of the United States may make use of the invention shown and described without payment of royalties.

What is claimed is:

1. A narrow band pass filter showing relatively high transmission to infrared radiation in the wave band between 3.5 and 5.5 microns and comprising a sheet comprising partially dehydrohalogenated material from the class consisting of polyvinyl chloride and polyvinylidene chloride which has been imbibed in a bath comprising a swelling agent, a conversion agent and a diluent and thereafter heated until the chlorine content of said sheet has been reduced by from one-fifth to one-third, and a highly concentrated, thin coating on said sheet of a multiplicity of minute particles of a metallic oxide of mean linear particle size between .25 and .5 micron, said filter being substantially opaque to all radiation in the visible and in the near-infrared below about 1 micron and showing very low transmission, of the order of not more than 5%, for radiation between 1 and 3.5 microns.

2. The filter of claim 1 wherein the metallic oxide is titanium dioxide.

3. The filter of claim 2 wherein the mean linear particle size is approximately .35 micron.

4. The filter of claim 2 wherein the titanium dioxide is suspended in a carrier comprising an oil.

5. The filter of claim 1 wherein the metallic oxide is magnesium oxide.

6. The filter of claim 1 wherein the metallic oxide is zinc oxide.

ELKAN R. BLOUT.
RICHARD S. CORLEY.
PATRICIA L. SNOW.

REFERENCES CITED

The following references are of record in the file of this patent:

UNITED STATES PATENTS

| Number | Name | Date |
|---|---|---|
| 2,099,976 | Hagedorn | Nov. 23, 1937 |
| 2,392,095 | Lemmers | Jan. 1, 1946 |
| 2,446,984 | Rogers et al. | Aug. 10, 1948 |

FOREIGN PATENTS

| Number | Country | Date |
|---|---|---|
| 499,387 | Great Britain | Apr. 21, 1936 |

OTHER REFERENCES

Fierz-David et al. article in Helvetica Chimica Acta: vol 28, 1945, pages 455 to 464 entitled "Vinyl Chloride and its Polymerization Products: Polyvinyl Chloride." (Abstract #120 in National Paint, Varnish and Lacquer Association for Jan. 1947, pages 29 and 30. Photostatic Copy in Division 50, Class 260–92.8).